N. H. SCHICKEL.
CHARGE TREATING DEVICE FOR INTERNAL COMBUSTION ENGINES.
APPLICATION FILED DEC. 7, 1912.
1,203,791.
Patented Nov. 7, 1916.
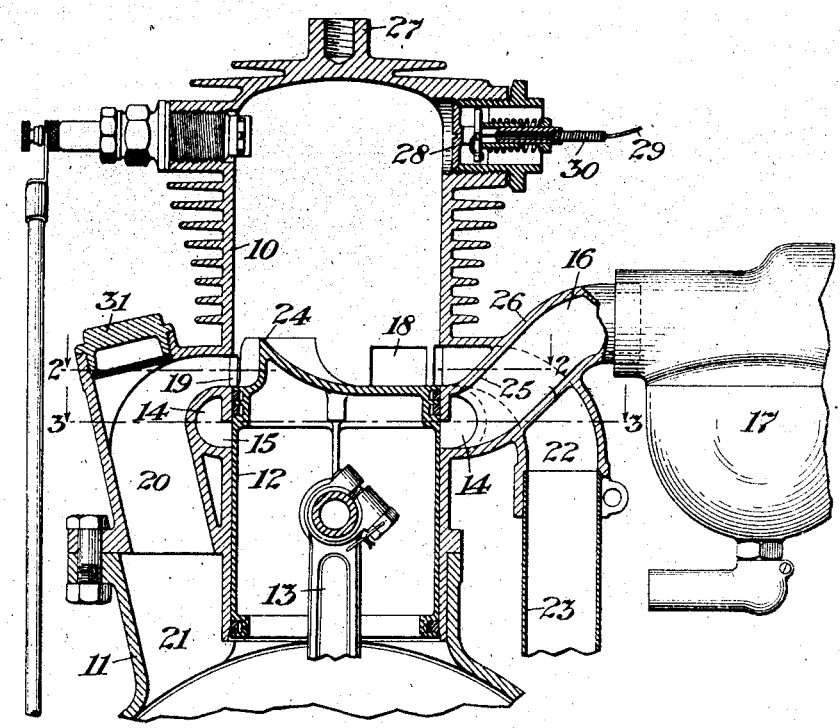
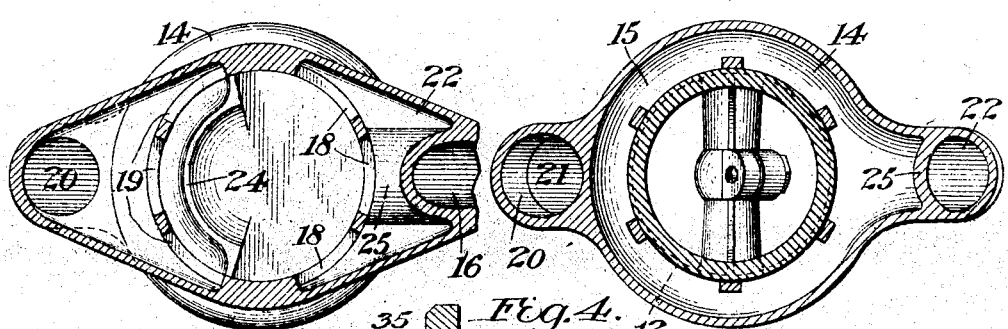
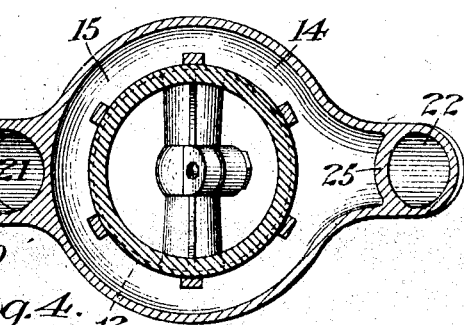
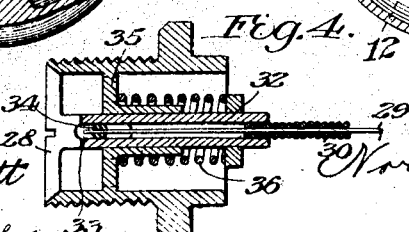
Witnesses;
Chas. F. Clagett
Florence Seven
Inventor,
Norbert H. Schickel
By C. W. Fairbank
his Attorney.

UNITED STATES PATENT OFFICE.

NORBERT H. SCHICKEL, OF STAMFORD, CONNECTICUT.

CHARGE-TREATING DEVICE FOR INTERNAL-COMBUSTION ENGINES.

1,203,791.  Specification of Letters Patent.  Patented Nov. 7, 1916.

Application filed December 7, 1912. Serial No. 735,464.

*To all whom it may concern:*

Be it known that I, NORBERT H. SCHICKEL, a citizen of the United States, and resident of Stamford, in the county of Fairfield and State of Connecticut, have invented certain new and useful Improvements in Charge-Treating Devices for Internal-Combustion Engines, of which the following is a specification.

This invention relates to certain improvements in devices for rendering more uniform, mixtures of gases and partly vaporized liquids and is particularly useful in connection with internal combustion engines for rendering more homogeneous the charge before it enters the cylinder.

In the common form of carbureter, the mixture is formed by the delivery of liquid fuel to a current of air as the latter is drawn through the carbureter but the rate of flow of this air current is variable and even substantially ceases between successive charge admission of a single cylinder engine. The air, particularly if it be in the form of a series of puffs, not only vaporizes a portion of the liquid fuel in passing through the carbureter but carries along a portion of the liquid in the form of spray or minute drops or globules. If the charge be taken directly into the cylinder these drops do not have time to completely vaporize and when the explosion takes place they burn comparatively slowly and do not add materially to the power of the explosion. Furthermore they do not receive sufficient oxygen for complete combustion and therefore they often merely carbonize and deposit on the adjacent surfaces as carbon or soot. By means of my invention I seek to insure the complete vaporization of these minute drops and at the same time render the charge more homogeneous without baffling or retarding the flow of the mixture and without expanding the mixture by appreciable heating. In carrying out my invention I take advantage of the fact that these drops possess an appreciable mass and when in motion have sufficient momentum to tend to continue traveling in the same straight line even though the course of the gas be slightly changed.

A preferred type of construction is one in which the supply pipe between the carbureter and the engine includes an elbow which causes the gas to slightly change its direction with means for heating that wall of the elbow against which the minute drops or globules of liquid fuel are projected so that they will be heated and vaporized but the main body of the gas which travels through the supply pipe will not be heated to any appreciable extent. Practically the heating is applied only to the liquid particles as distinguished from the body of the gas and the heating is at the point at which natural condensation would occur if no heating were employed. Any particular particle of liquid in being thrown out from the body of the gas and striking the surface is retarded and time is consumed in effecting the evaporation. Therefore when it is vaporized it is mixed with a portion of the air considerably behind that portion from which it was thrown out. Thus the excess of fuel in the richer portions of the charge is taken out and returned to the charge where the latter is poor and the charge becomes more homogeneous.

My invention has its chief utility on engines where it is not possible or is not convenient to have a long supply pipe from the carbureter to the engine inlet and is especially useful on motor cycles where it is customary to reduce the length of pipe between the carbureter and the engine to the minimum. To secure the proper heating of the evaporating surface I preferably employ the exhaust gas from the engine and may produce an extremely simple and compact arrangement by forming contiguous passages for the charge and the exhaust in the same casting with the engine cylinder. Such construction is particularly applicable to two cycle engines having crank case compression.

Various changes may be made in the construction and arrangement of parts within the scope of the appended claims and without departing from the spirit of my invention and therefore I desire the specific construction which is shown in the accompanying drawings to be considered in an illustrative rather than in a limiting sense.

In these drawings similar reference characters indicate corresponding parts in the several views and Figure 1 is a central longitudinal section through the upper portion of an engine constructed in accordance with my invention. Figs. 2 and 3 are transverse sections on the lines 2—2 and 3—3 respectively of Fig. 1, and Fig. 4 is a section through the relief valve in a plane at right angles to the plane of Fig. 1.

I have illustrated my invention as applied to an engine especially designed for use on a motor cycle. The engine has a cylinder 10 mounted on a base or crank case 11 and within the cylinder is a piston 12 having a connecting rod 13. The engine is of the two stroke cycle type and has an annular chamber 14 encircling the cylinder and delivering through a plurality of ports 15 to the crank case when the piston is at the upper end of its stroke. This annular chamber is cast integral with the cylinder and has a supply passage 16 also cast integral with the cylinder and leading downwardly from a carbureter 17. Directly above the series of inlet ports 15 to the crank case are two sets of ports 18 and 19 the former acting as exhaust ports from the cylinder and the latter as inlet ports. The inlet ports communicate with a passage 20 also cast integral with the cylinder and communicating at its lower end with a passage 21 from the crank case. The exhaust ports 18 communicate with a passage 22 leading outwardly and downwardly and encircling a portion of the supply passage 16. The lower end of the passage 20 may be connected to an exhaust pipe 23 leading to a muffler or to any other point of disposal of the exhaust gases. The piston is shown as being substantially hollow with an upwardly extending flange or baffle 24 on the face thereof adjacent to the inlet ports so that the incoming charge is deflected upwardly toward the cylinder head to force the exhaust gases out through the exhaust port 18.

As previously stated the passages 16 and 22 cross each other the former extending downwardly to the ports 15 while the latter extends downwardly from the upper ports 18. The upper end of the passage 16 is substantially horizontal as is also the lower portion whereas the intermediate portion, that is the portion which extends through the passage 22 is inclined so that this inclined portion and the upper horizontal portion form what might be considered an elbow or bend. The wall portion 25 which forms the partition between the two passages 16 and 22 is on the far side of the bend and is somewhat below the point where the inclined portion joins the upper horizontal portion. In other words the inclined portion of the passage has a wall 26 above the exhaust passage. The exhaust gases contact directly with the wall portion 25 but not with the wall portion 26. When the piston reaches its extreme upper position the lower edge uncovers the ports 15 and the partial vacuum in the crank case draws air into the carbureter and draws the resulting charge of explosive mixture into the crank case. This mixture usually includes some liquid fuel in the form of minute drops or globules bodily carried by the gas. As the mixture leaves the carbureter it is traveling horizontally and tends to continue traveling in the same straight line and impinge against the wall portions 26 and 25. The body of the gas has its direction more easily changed than the liquid and although it contacts with these wall portions it is only the outer layer or strata of the gas which is heated by the wall 25. The liquid coming into direct contact with these walls does not rebound but tends to condense and flow downwardly across the heated wall 25 and is there evaporated and rejoins the mixture in the form of a vapor rather than as liquid particles. The gas itself strikes the wall portion 26 before reaching the wall portion 25 and tends to rebound or be deflected against the lowermost portion of the annular chamber 14 and thus there is very little pressure or impact of the gas against that portion of the wall which is heated to the highest degree, namely the portion 25.

As previously stated the particular engine illustrated is designed for motor cycle work and is of the two stroke cycle type but it is evident that the invention may be advantageously employed in connection with four stroke cycle engines or may be employed as a separate device adapted to be attached to engine as a part of the inlet conduit. The particular engine illustrated has a threaded socket 27 in the head by means of which the engine may be secured to the transverse portion of the motor cycle frame and has a relief valve 28 normally held closed by a spring and movable to open position by a wire 29 inclosed in a flexible tube 30 and extending to the handle bar or other suitable portions of the machine. This valve operating mechanism forms no portion of my present invention. It may be constructed and may operate as follows: The valve 28 has a tubular valve stem 32 which, adjacent to the valve, has oppositely disposed longitudinally extending slots 33 receiving a cross bar 34 engaging with the inner surface of a perforated partition 35 extending across and rigid with the valve casing. The wire extends through the valve stem and its end is secured to said cross bar. A spring 36 encircles the valve stem and has one end engaging with the outer surface of said partition and the other end engaging with a collar rigid with the end of the flexible tube 30 and with the valve stem. Thus the spring tends to hold the valve shut. By sliding the flexible tube 30 along the wire toward the engine the spring is compressed and the valve is opened. The transfer port 20 leading from the crank case to the annular port 19 is preferably formed straight and at an angle to the cylinder so as to clear the passage 14. A removable cap 31 may be employed to permit access to the passage which leads to the crank case as shown in my companion application, Serial No. 805,485 filed December 9th, 1913.

Having thus described my invention what I claim as new and desire to secure by Letters Patent is:

1. An internal combustion engine of the crank case compression type having a cylinder provided with two annular rows of ports the lower row communicating with the crank case when the piston is at the beginning of the power stroke, and the upper row communicating with the working chamber when the cylinder is at the end of the power stroke, an annular chamber encircling said cylinder at said lower annular row of ports and communicating therewith, two separate chambers directly above said annular chamber and one communicating with a portion of said upper row of ports and the other communicating with the remaining portion of said upper row of ports, a passage connecting one of said second-mentioned chambers with the crank case, an exhaust conduit extending downwardly from the other of said second-mentioned chambers, and a supply conduit leading downwardly to said annular chamber, said conduits being cast integral and one of said conduits extending transversely through the other conduit.

2. A two-cycle engine of the crank case compression type having an exhaust port from the cylinder, an inlet port to the crank case closely adjacent thereto, chambers cast integral with said cylinder and communicating with said ports, a supply conduit leading downwardly to the inlet port chamber, and an exhaust conduit leading downwardly from said exhaust port chamber, said conduits being cast integral with said chambers and said cylinder, and one of said conduits passing transversely through the other.

3. A two-cycle engine of the crank case compression type having an exhaust port from the cylinder, an inlet port to the crank case closely adjacent thereto, chambers cast integral with said cylinder and communicating with said ports, a supply conduit leading downwardly to the inlet port chamber, and an exhaust conduit leading downwardly from said exhaust port chamber, said conduits being cast integral with said chambers and said cylinder, and the inlet conduit passing transversely through the exhaust conduit.

4. A two-cycle engine of the crank case compression type having an exhaust port from the cylinder, an inlet port to the crank case closely adjacent thereto, chambers cast integral with said cylinder and communicating with said ports, an inlet conduit leading downwardly to the inlet port chamber, and an exhaust conduit leading downwardly from said exhaust port chamber, said conduits being cast integral with said chambers and said cylinder, the inlet conduit having a horizontally disposed section and a downwardly inclined section, a portion of the latter being disposed above said exhaust conduit and a portion extending transversely through said exhaust conduit.

5. An internal combustion engine having an exhaust port, an inlet port, closely adjacent thereto, chambers cast integral with said cylinder and communicating with said ports, a supply conduit leading downwardly to the inlet port chamber, and an exhaust conduit leading downwardly from said exhaust port chamber, said conduits being integral with said chambers and said cylinder, and one of said conduits passing transversely through the other.

6. An internal combustion engine having a cylinder provided with two annular rows of ports, the lower row communicating with the compression chamber, when the piston is at the beginning of the power stroke, and the upper row communicating with the working chamber when the cylinder is at the end of the power stroke, an annular chamber encircling said cylinder at said lower annular row of ports and communicating therewith, two separate chambers directly above said annular chamber and one communicating with a portion of said upper row of ports and the other communicating with the remaining portion of said upper row of ports, a passage connecting one of said second-mentioned chambers with the compression chamber, an exhaust conduit extending downwardly from the other of said second-mentioned chambers, and a supply conduit leading downwardly to said annular chamber, and one of said conduits extending transversely through the other conduit.

7. A two-cycle engine of the crank case compression type having an exhaust port from the cylinder, an inlet port to the crank case closely adjacent thereto, chambers communicating with said ports, an inlet conduit leading downwardly to the inlet port chamber, and an exhaust conduit leading downwardly from said exhaust port chamber, the inlet conduit having a horizontally disposed section and a downwardly inclined section, a portion of the latter being disposed above said exhaust conduit and a portion extending transversely through said exhaust conduit.

8. An internal combustion engine having an exhaust port, an inlet port adjacent thereto, chambers communicating with said ports, an inlet conduit leading downwardly to the inlet port chamber, and an exhaust conduit leading downwardly from said exhaust port chamber, the inlet conduit having a horizontally disposed section and a downwardly inclined section, a portion of the latter extending transversely through said exhaust conduit, whereby the supply is subjected to the heating influence of the exhaust.

Signed at New York city in the county of New York and State of New York this 11th day of November A. D. 1912.

NORBERT H. SCHICKEL.

Witnesses:
FLORENCE LEVIEN,
C. W. FAIRBANK.